W. COONEY.
Shuttles for Sewing-Machines.
No. 138,134. Patented April 22, 1873.
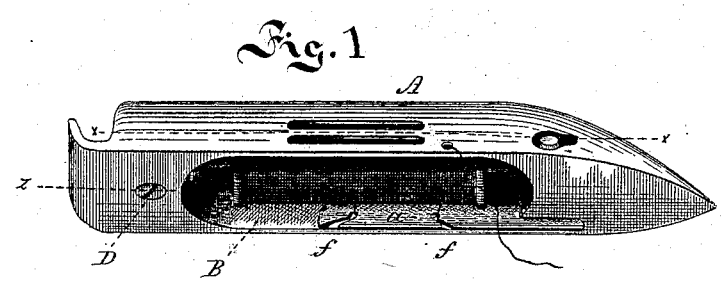
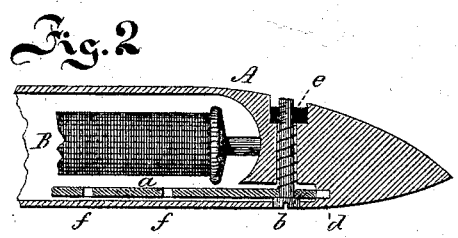
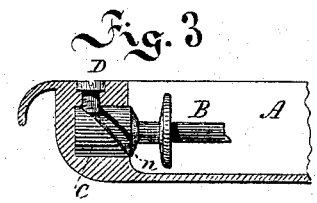
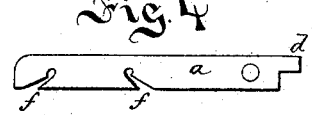
Witnesses
William Cooney,
Inventor
By Atty.

UNITED STATES PATENT OFFICE.

WILLIAM COONEY, OF BRIDGEPORT, CONNECTICUT, ASSIGNOR TO HOCKENSMITH & COONEY, OF SAME PLACE.

IMPROVEMENT IN SHUTTLES FOR SEWING-MACHINES.

Specification forming part of Letters Patent No. 138,134, dated April 22, 1873; application filed January 17, 1873.

*To all whom it may concern:*

Be it known that I, WILLIAM COONEY, of Bridgeport, in the county of Fairfield and State of Connecticut, have invented a new Improvement in Sewing-Machine Shuttle; and I do hereby declare the following, when taken in connection with the accompanying drawing and the letters of reference marked thereon, to be a full, clear, and exact description of the same, and which said drawing constitutes part of this specification, and represents, in—

Figure 1, a perspective view; Fig. 2, a longitudinal section of the point on line *x x;* Fig. 3, a longitudinal section of the rear on line *z z;* Fig. 4, a top view of the lever.

This invention relates to an improvement in the common bobbin-shuttle, the object being, first, to adjust the tension upon the thread; and, second, to adjust the tension upon the bobbin. The invention consists, first, in a lever bearing upon the surface of the shuttle, and between which and the surface of the shuttle the thread passes, combined with a screw, spring, and nut in the head of the shuttle, the screw rigidly defining the distance or space between the said lever and the surface of the shuttle, whereby the pressure of the lever is adjusted; second, in constructing the socket which supports the bobbin at the heel with a spiral groove upon its surface and a set-screw setting into the said groove to hold the socket in any position, adjustable by the turning of the socket, as more fully hereinafter described.

A is the shuttle-case of any known construction, and B the bobbin. At some convenient point, here represented as upon the lower side, a lever, *a,* is arranged, the head of the shuttle slotted, as seen in Figs. 1 and 2, to receive the lever, and a tenon, *d,* formed upon the end of the lever to set into a seat made in the end of the slot, as seen in Fig. 2, this tenon acting as a fulcrum for the lever. Through the lever and head a screw, *b,* is passed, running into a nut, *e,* upon the opposite side, the head of the screw bearing upon the outside of the lever and a spiral spring around the screw between the nut and lever, the tendency of which is to hold the lever down upon the surface of the shuttle. By turning the screw in, the lever is forced away from the surface of the shuttle, the screw thus rigidly defining the distance between the lever and the surface of the shuttle—that is, to prevent the lever from approaching the surface of the shuttle nearer than the distance defined by the screw. By withdrawing the screw the spring bears it upon the surface. The lever is provided with suitable eyes or slots for the reeving of the thread, the thread running beneath the lever and between it and the surface of the shuttle, so that the lever bearing thereon creates a friction upon the thread to make more or less tension, and this tension is increased or diminished by the turning of the screw *b,* as before described. At the heel of the shuttle a socket, C, is inserted, containing the spring and seat for the end of the shuttle-spindle. This socket has a spiral groove, *n,* formed upon its surface, and into this a set-screw, D, is turned to hold the socket in position.

Loosening the screw slightly the socket may be rotated in either direction, the spiral groove causing it to be run out or in, according to the direction in which it is turned. Running out increases the pressure by shortening the distance between the bearings for the shuttle-spindle, and running in diminishes the pressure by lengthening the said distance.

I claim as my invention—

1. In a sewing-machine shuttle, the lever *a,* provided with suitable eyes *f* for threading, combined with a screw, *b,* and nut *e,* and a spring between the said nut and lever in the head of the shuttle, the screw rigidly defining the distance or nearest approach of the lever to the shuttle-surface, substantially as set forth.

2. In a sewing-machine shuttle, the socket C, constructed with a spiral groove, *n,* combined with a set-screw, D, in the heel of the shuttle, substantially as set forth.

WILLIAM COONEY.

Witnesses:
GEO. A. STAPLES,
THEODORE E. VEIT.